Figure 1:
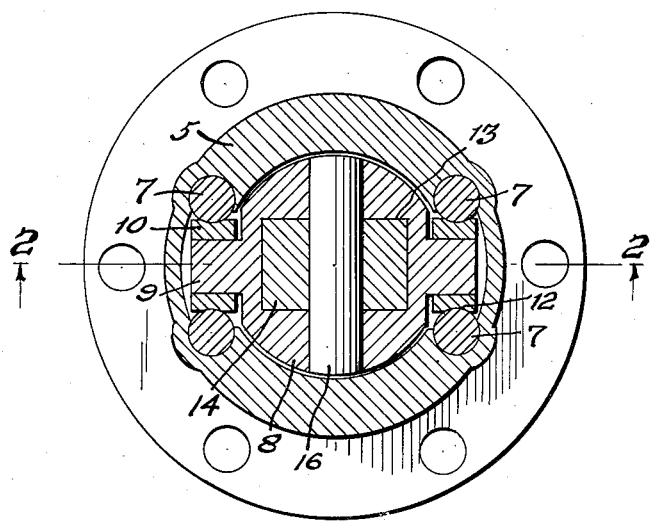

July 3, 1951  A. BOGE, SR., ET AL  2,559,108
UNIVERSAL JOINT
Filed Sept. 23, 1949

Inventors,
Adolf Boge, Sr.
Adolf Boge, Jr.

By Glascock Downing Seebold
Attorneys

Patented July 3, 1951

2,559,108

UNITED STATES PATENT OFFICE 2,559,108

UNIVERSAL JOINT

Adolf Boge, Sr., Altgluck, and Adolf Boge, Jr., Eitorf, Germany

Application September 23, 1949, Serial No. 117,431
In Germany October 1, 1948

2 Claims. (Cl. 64—8)

Among the various known forms of Cardan joint are those in which a centre-piece is both rockable and axially slidable within a housing. In this centre-piece the Cardan-stub of the driven shaft is rockable on an axis which is at right angles both to the longitudinal axis of the casing, in which direction sliding can take place, and to the rocking axis of the centre piece. It has been found that such joints are inclined to wear excessively. For this reason it has been proposed to provide the centre-piece with trunnions on its rocking axis and to journal these in slide-blocks, so that the sliding movement is executed by the slide-blocks alone and the rocking movement exclusively by the centre-piece in the slide-blocks. An advantage was expected from the fact that the transmission of force now no longer took place with slight tilting exclusively at two diagonally opposite longitudinal edges of the centre-piece, but that it was possible to bring the surfaces of the slide-blocks into use at the same time to transmit forces and so to distribute the line-contact obtained hitherto over comparatively large surfaces.

This proposal has not come into practical use because on one hand the machining costs are relatively high and on the other hand because accuracy could not be achieved to the degree necessary to ensure that both the centre-piece and the slide-blocks took part in the transmission of forces. It would have seemed obvious to avoid transmission of forces from the centre-piece to the housing and to transmit the rotation from the housing through the slide-blocks alone to the centre-piece. But then the old fault would have reappeared, for the, in this case smooth, guide surfaces of the slide-blocks and the corresponding guide grooves in the housing would have tended to wear and no advantage would have been obtainable in this way, also the provision of the end surface of the slide-blocks and trunnions in relation to the housing as well as of the corresponding surfaces of the housing was not quite simple in so far as these parts again were to be cylindrically formed and also these surfaces are difficult to machine. Such a construction is described in German Patent No. 7,323,346.

According to the present invention in contradistinction to the last mentioned construction, transmission of forces through the centre-piece and slide-blocks is avoided and, as already indicated, the rotational movement is imparted exclusively through the slide-blocks and thence transmitted to the centre-piece. At the same time this is done in a particular way in that the slide-blocks are provided each with two guide grooves of circular profile which extend in the direction of longitudinal sliding. To these guide grooves correspond pairs of cylindrical rods which are arranged in the casing and serve to guide the slide-blocks.

The advantages to be obtained from this arrangement are in the first place that all movements in the joint without exception can take place on surfaces of turned form, i. e. surfaces of revolution. Thus, as in the hitherto known joints, the rocking movements of the Cardan stub in the centre-piece is made possible by a bolt or pivot traversing the centre-piece, which engages corresponding bores in the centre-piece and in the Cardan stub. Bores as well as the bolt can be produced with the greatest accuracy and maintenance of dimensions can be satisfactorily verified in manufacture by the simplest means. The rocking movements of the centre-piece in the slide-blocks is again made possible by trunnions of cylindrical form engaging in corresponding bores in the slide-blocks, and here again the dimensions of the parts and high quality of the surface can be achieved in full measure in production. According to the invention the same also applies to the longitudinal sliding of the slide-blocks in the casing in so far as the grooves in the slide blocks can be directly produced as bores and thereafter the generally prismatic slide blocks parted off, e. g. from a bar. Also the corresponding rods to be mounted in the casing can be made with the highest accuracy and subsequently inserted in the casing.

Transmission of forces takes place during longitudinal sliding solely between the corresponding cylindrical surfaces of the pins and the slide-blocks, so that all other surfaces of the slide-blocks can be left rough machined with the necessary clearance in relation to the neighbouring parts. The bores in the slide blocks to receive the trunnions of the centre piece are naturally, as already mentioned, to be machined with the highest accuracy.

The high accuracy in the machining of the surfaces and the possibility of free choice of material permits high loading. In consequence, it is in no way essential to preserve the prismatic form of slide-block used hitherto. On the contrary instead of such blocks, blocks of circular form, in effect slide-rollers, can be used. These have the advantage on one hand that the friction is reduced and the mechanical efficiency of the joint is therefore increased, and on the other hand that the sliding surfaces wear out less rapidly because new points on the roller peripheries are always being presented to the guide rods. This applies particularly to motor vehicles in which the direction of rotation and of force transmission is frequently changed so that the position of the slide-rollers in relation to the trunnions of the centre piece is also frequently substantially changed.

A further advantage of the construction in accordance with the invention is that the material of which the two parts, not in particular the rods, is made can be of any desired high quality without the cost of production of the joint being substantially increased. The guide surfaces for the slide-blocks hitherto known were necessarily of the material of the housing and economy prevented a free choice of material. This also imposed limitation on any treatment which could be given to the surface. On this score also the the invention distinguishes from the construction hitherto known in that the rods can be hardened or otherwise improved without impediment. Finally it should be mentioned that the use of guide rods has the further advantage that they can be replaced as soon as they no longer hold up to their dimensions.

The fastening of the rods in the housing can be effected in various ways. That it is possible for them to fit tightly at their ends in the bottom and cover of the housing on cylindrical or conical surfaces. Or they can be provided with screw threads and be screwed into these parts. They can at the same time be used as anchors to hold together the cover, side wall and bottom of the housing. They can further be provided with eccentric parts at the ends and the advantage is then obtained that the rods can be rotated to give the correct spacing.

In effecting such rotation care must be taken that the slide-blocks guided by them are not canted over, it being unimportant however whether the slide-block is moved bodily a little more or less along the corresponding trunnion of the centre-piece because here ample clearance can be allowed without difficulty. With non-eccentric mounting it is further possible to turn the rods into some three different positions, enabling the working surface to be changed for instance, if the sliding surface are damaged by dirt entering through faulty sealing of the joint.

An example of the invention is illustrated in the accompanying drawing,

Figure 1 being a cross-section, and

Figure 2:
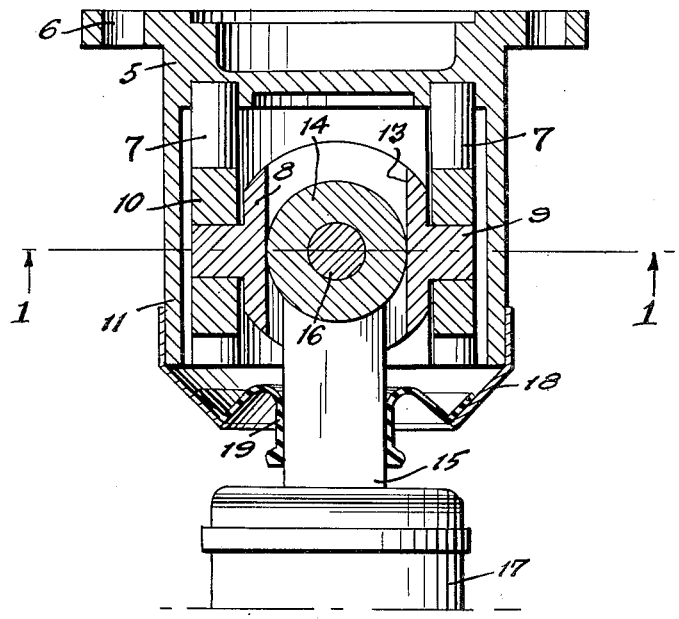

Figure 2 a longitudinal section on the line II—II of Figure 1.

The housing 5 is cast in one piece with a bottom flange 6 which can be secured to the driving shaft. In the housing are inserted four guide rods 7, parallel with the axis and taking a bearing against corresponding bores in the wall of the housing. A spherically turned centre-piece 8 has at its ends trunnions 9 by which it is rockably journalled in slide-blocks 10. These slide-blocks are of generally rectangular prismatic form and on their end surfaces have adequate clearance in relation to the centre-piece 8 and the housing wall 11. They are guided only in relation to the rods 7 by ground guide grooves 12 and the rods 7 also have ground surfaces.

In the centre-piece is a rectangular, central, longitudinal passage 13 in which fits the end 14, constructed as a bearing, of the Cardan stub 15. The pivoting of the stub 15 in the centre-piece 8 is effected by a pivot pin 16 which is pushed into a corresponding bore in the centre-piece 8. The Cardan stub 15 is secured to the shaft 17 and the housing 9 at the end of its wall 11 is sealed off by a push-on sheet metal cover 18 and a rubber cuff 19, so that the housing can be filled with oil.

The construction of the individual parts can be varied without departing from the invention. Thus it is possible without any difficulty to fabricate the housing, e. g. by making a coupling flange of plate, a bottom of pressed sheet and a wall of tube and connecting these parts together by welding, instead of making the housing as an iron casting.

We claim:

1. In a universal joint, the combination of a Cardan stub, a centre piece rockable on a first transverse axis on said stub, trunnions on said centre-piece set on a second transverse axis at right angles to said first transverse axis, slide-blocks rockably journalled one on each of said trunnions, a housing, and four longitudinal cylindrical guide rods set in two pairs in said housing, said slide-blocks each having guide grooves of circular profiles whereby they slidably engage the respective pairs of guide rods.

2. A universal joint as set forth in claim 1 wherein said slide-blocks are of substantially rectangular prismatic form.

ADOLF BOGE, Sr.
ADOLF BOGE, Jr.

REFERENCES CITED

The following references are of record in the file of this patent:

UNITED STATES PATENTS

| Number | Name | Date |
|---|---|---|
| 1,109,006 | Neal | Sept. 1, 1914 |
| 1,330,051 | Berardinelli et al. | Feb. 10, 1920 |
| 2,271,975 | Greiner | Feb. 3, 1942 |

FOREIGN PATENTS

| Number | Country | Date |
|---|---|---|
| 732,346 | Germany | 1943 |